(No Model.)  3 Sheets—Sheet 1.
J. M. CASE.
GRAIN REDUCTION MACHINE.
No. 259,481. Patented June 13, 1882.
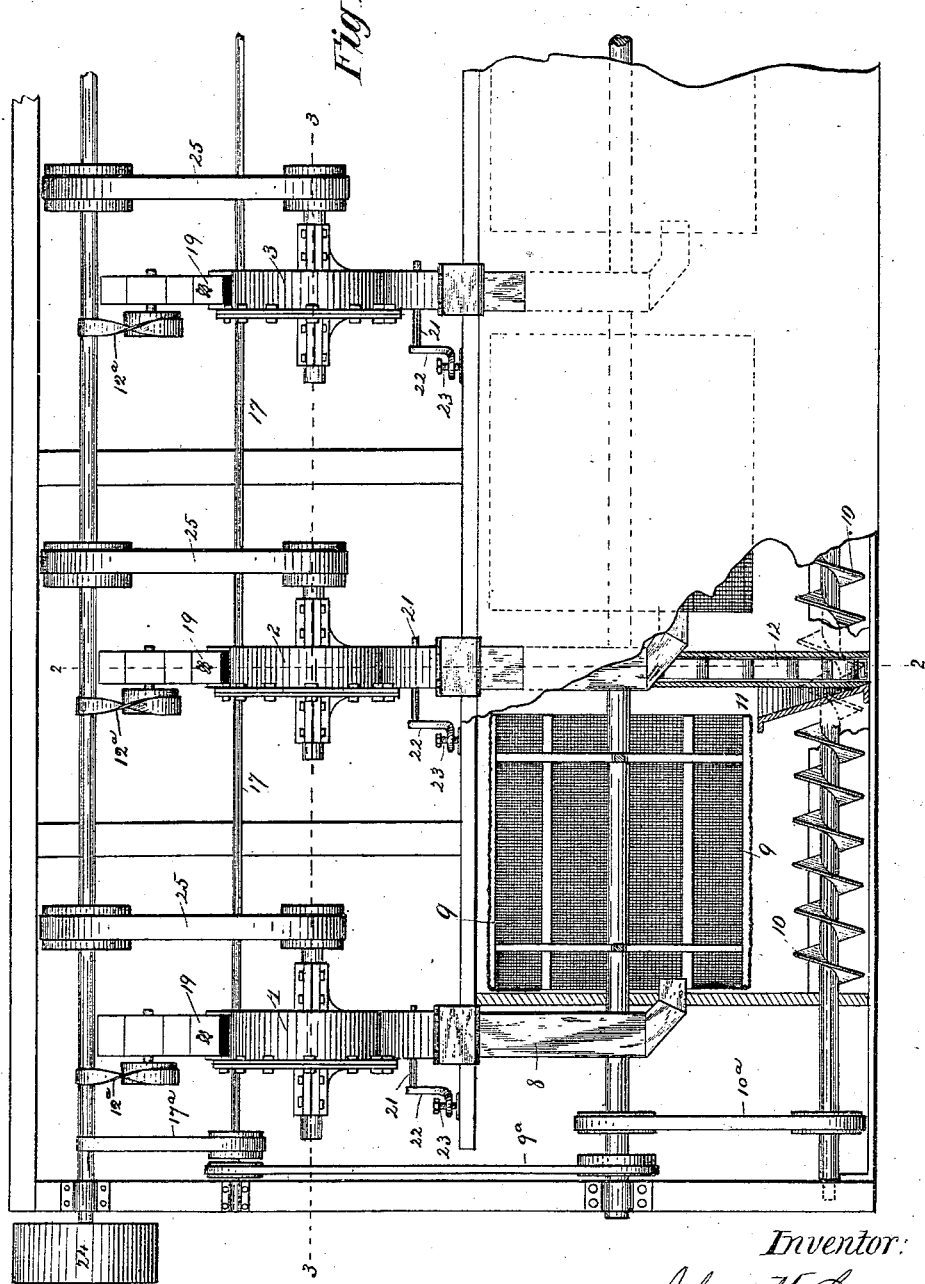
Attest:
Geo. T. Smallwood Jr.
Harry E. Knight
Inventor:
John M. Case
By Knight Bros
Attys

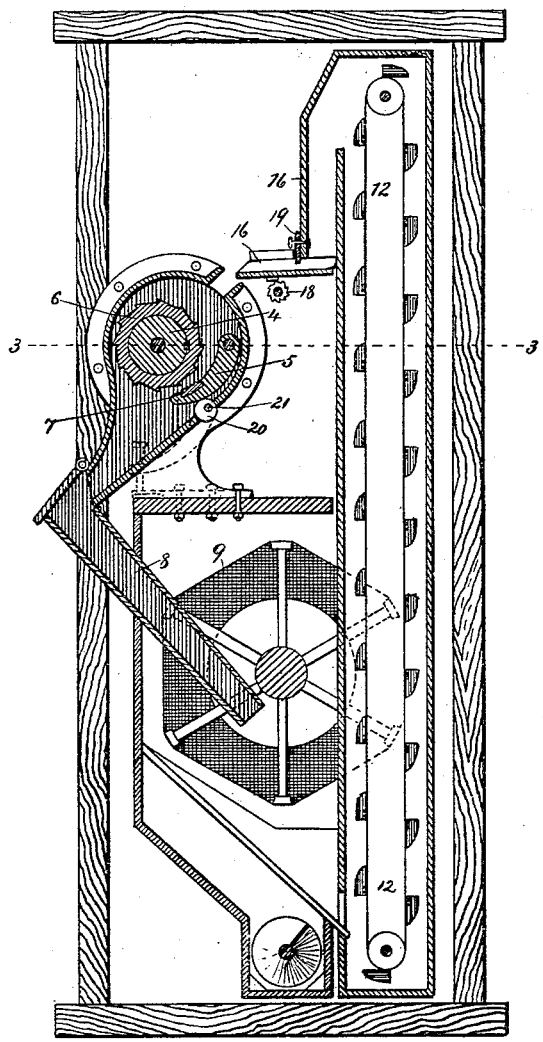

(No Model.) 3 Sheets—Sheet 3.
J. M. CASE.
GRAIN REDUCTION MACHINE.
No. 259,481. Patented June 13, 1882.
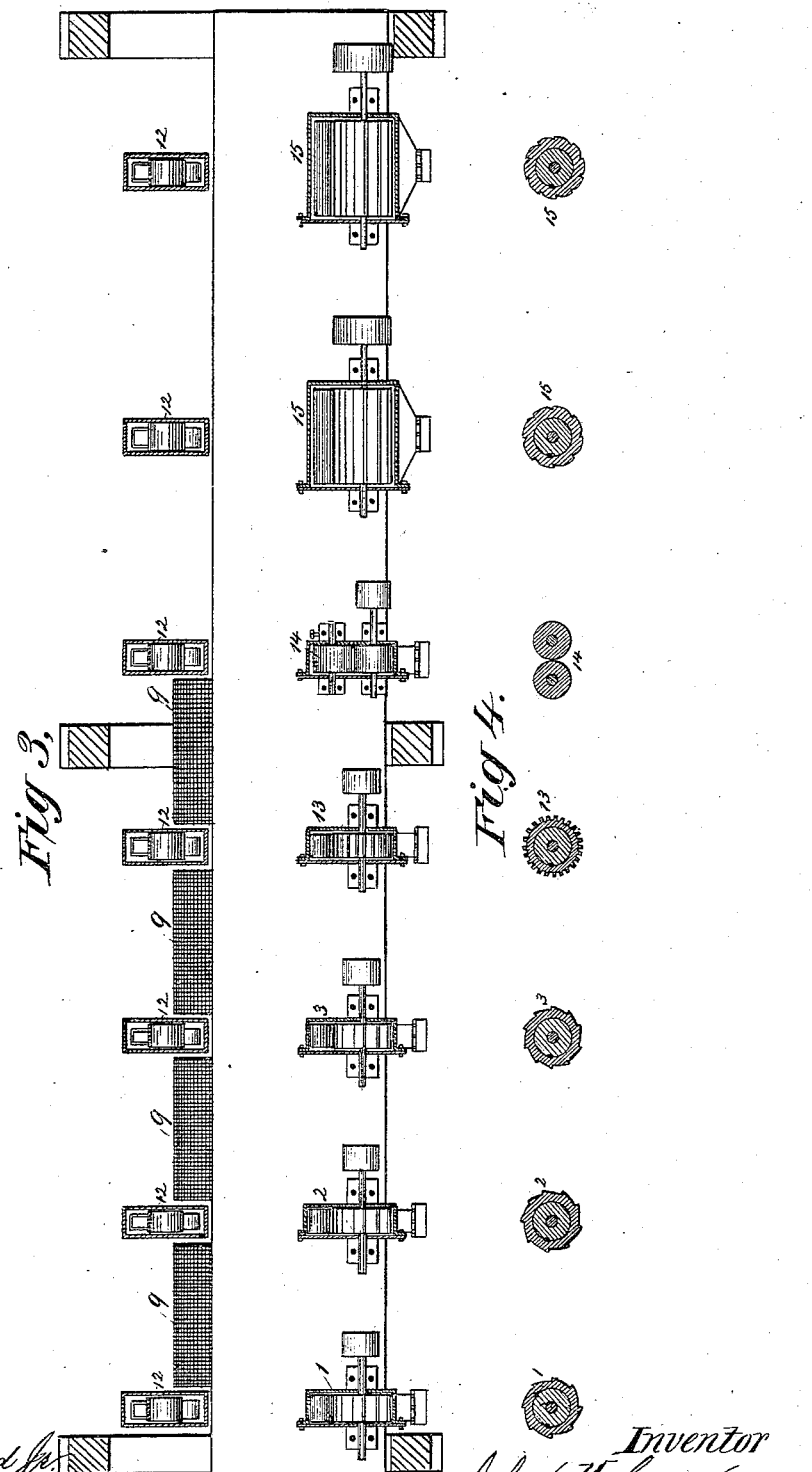
Attest:
Geo. F. Smallwood Jr.
Harry E. Knight
Inventor
John M. Case
By Knight Bros. Attys

UNITED STATES PATENT OFFICE.

JOHN M. CASE, OF COLUMBUS, OHIO, ASSIGNOR TO THE CASE MANUFACTURING COMPANY, OF SAME PLACE.

GRAIN-REDUCTION MACHINE.

SPECIFICATION forming part of Letters Patent No. 259,481, dated June 13, 1882.

Application filed March 29, 1881. (No model.)

*To all whom it may concern:*

Be it known that I, JOHN M. CASE, a citizen of the United States, residing at Columbus, in the county of Franklin and State of Ohio, have invented Improvements in Grain-Reduction Machines, of which the following is a specification.

In order that the invention may be fully understood, I will proceed to describe it with reference to the accompanying drawings, in which—

Figure 1 is an elevation, partly in longitudinal section, of a series of three reduction-machines and the screens, conveyers, and elevators used in connection therewith. Fig. 2 is a transverse section on the line 2 2, Fig. 1. Fig. 3 is a horizontal section on a smaller scale on the line 3 3, Figs. 1 and 2, showing also the bran-machine, tailings-crusher, and flouring-rolls employed in connection with the reduction-machines, as hereinafter described. Fig. 4 shows transverse sections of various rolls arranged opposite the machines in which they are employed.

The reduction-machines 1 2 3, of which five (more or less) may be used to advantage in one series, are each constructed with a rotating cylinder operating upon an adjustable shoe or concave, 5.

The rotating cylinder 4 is provided with a removable ring, 6, which may be made of chilled iron or steel, for the purpose of imparting hardness. The shoe 5 is also provided with an adjustable or removable plate, 7, made of chilled iron or steel and forming the grinding-surface. The object of making these rings and shoe-plates removable is to enable them to be readily replaced in case of wear or damage.

The removable rings and shoe-plates are provided with corrugations suitable for the material operated upon.

I employ coarse corrugations for the first reduction for breaking the wheat simply in halves, and gradually finer corrugations in the successive machines through which the material is passed, becoming at each step more reduced.

As the material acted upon passes through each of the successive reduction-machines it is conducted by a spout, 8, to a separating-screen, 9, as shown in Fig. 1. This screen may be a revolving bolt rotated by a belt, 9$^a$, a shaking riddle, or screen; but I prefer a revolving bolt, as represented, clothed with wire-cloth. This bolt or screen separates the middlings from the broken wheat and permits it to drop down into the screw-conveyer 10, turned by a belt, 10$^a$, which conducts it to any point desired. There may be two or more of these conveyers arranged with "cut-offs," so as to separate the different grades of middlings, as the miller may desire.

The broken wheat too coarse to pass through the screen passes over the ends of the successive screens at 11, Fig. 1, and is spouted to an elevator, 12, Figs. 1 and 2, which carries the material up, and is operated by a belt, 12$^a$, and discharges it into the next machine in the series.

After passing through the series of reduction-machines the bran is conducted into a bran-cleaning machine, 13, which may be constructed similarly to the reduction-machines, except that the corrugations are made finer and sharper, so as to remove any glutinous or starchy material which may still adhere to the bran.

Following the bran-machine I use one or more sets of rolls, 14, mounted on the same frame, the object of which is to crush the tailings from the purifiers in order to flatten the germ so that it may be bolted out.

Following the rolls 14, I arrange one or more machines, 15, with either rollers or burrs for grinding the purified middlings into flour.

My improved separating-screen consists of a series of short bolts or riddles, all connected together and operated by one motion, as shown in Fig. 1.

In order to produce an even flow of the material to each successive reduction-machine, I employ feed-troughs 16, hinged to the sides of the elevators 12.

The shaft 17 is rotated by a belt, 17$^a$, that extends the entire length of the combined system of machines, and at each machine there is an eccentric or notched wheel, 18, keyed on the said shaft and rotated thereby. The feed-troughs 16 rest upon these eccentric or notched wheels, and by the rotation of the shaft the material is caused to flow down uniformly into the several machines, the gate 19 acting as a guard to prevent the material flowing out unevenly as it is thrown over by the elevators.

The adjustment of the shoe 5 to regulate the reduction may be effected in any suitable way.

I have shown an eccentric, 20, keyed on a shaft, 21, controlled by an arm, 22, which is held in any required position by a set-screw, 23.

The power is applied at the pulley 24, and each machine is connected independently by belts 25 25.

Instead of having the various machines in one line, as illustrated in the accompanying drawings, they may, without departing from the essential principles of my invention, be mounted in their frame in two lines wherever the shape of the space to be occupied may render it desirable. In this case I prefer to place the elevators back to back.

The operation of the machine is as follows: The wheat first enters the first reduction-machine at 1. This machine simply splits the berry in the center, liberating the dirt in the crease and much of the germ. This broken wheat passes down into the first screen, where the germ and dirt are bolted out and are conducted off and made into what is termed "low-grade" flour. The material passing over the end of the screen is conducted by the spout into the elevator 12, which takes it up and delivers it to the next reduction-machine. This machine is set closer together and makes a quantity of middlings, which are separated by the next screen in the series, and so on until the end of the series of reduction-machines is reached. The bran next passes to the bran-machine. The material from this machine is usually sent to the low-grade stones.

The middlings which have been made by the successive reduction-machines are conducted or spouted to a dusting-reel, which separates the flour from the middlings in customary manner. The middlings are then sent to the purifiers, and after being purified are conducted to the flouring-mills 15 15, Fig. 3. The chop made in these mills is sent to a bolt to be finished.

The tailings from the purifiers are conducted to the rolls 14 14, Fig. 3, and crushed, after which they are sent to the flour-bolts.

Having thus described my invention, the following is what I claim as new therein and desire to secure by Letters Patent:

1. A series of independent reduction-machines, arranged in horizontal line, a single frame therefor, a single driving-shaft, and separate driving mechanism for each machine connected with said single shaft, in combination with suitable screens arranged beneath said reduction-machines, and conveyers from said screens, as set forth.

2. A single portable frame, a series of reduction-machines mounted in horizontal line therein, a single driving-shaft, and gearing for operating said machines independently of each other from said single shaft, in combination with a series of screens arranged beneath said reduction-machines, a series of elevators connected with the single driving-shaft, and a conveyer, substantially as set forth.

3. A single portable frame, a single driving-shaft, and a bran-cleaning machine, in combination with a series of reduction-machines mounted in horizontal line, a series of screens, a series of elevators, and a conveyer, the whole being independently operated from said single driving-shaft, as set forth.

4. A single portable frame, a single driving-shaft, and a crushing-machine, in combination with a series of reduction-machines mounted in horizontal line, a series of screens, a series of elevators, and a conveyer, the whole being independently operated from said single driving-shaft, as set forth.

5. A single portable frame, a single driving-shaft, and a flouring-machine, in combination with a series of reduction-machines mounted in a horizontal line, a series of screens, a series of elevators, and a conveyer, the whole being independently operated from said single driving-shaft, as set forth.

JOHN M. CASE.

Witnesses:
OCTAVIUS KNIGHT,
HARRY E. KNIGHT.